United States Patent [19]

Maddox

[11] 4,429,831
[45] Feb. 7, 1984

[54] GROUND RELEASE IRRIGATION SYSTEM

[76] Inventor: Gerald H. Maddox, 5820 Sunrise Rd., Lincoln, Nebr. 68510

[21] Appl. No.: 248,541

[22] Filed: Mar. 27, 1981

Related U.S. Application Data

[63] Continuation-in-part of Ser. No. 187,985, Sep. 17, 1980, abandoned.

[51] Int. Cl.³ .............................................. B05B 3/00
[52] U.S. Cl. .................................... 239/177; 285/114
[58] Field of Search .............. 239/509, 514, 177, 556; 285/114, 115

[56] References Cited

U.S. PATENT DOCUMENTS 2,249,130  7/1941  Gunther ............................ 239/179
3,643,442  2/1972  Houston ......................... 239/177 X
3,951,165  4/1976  Seger et al. ..................... 239/177 X

OTHER PUBLICATIONS

Valley Corner System, 1977, Valmont Industries, Inc.

Primary Examiner—John J. Love
Assistant Examiner—Gene A. Church
Attorney, Agent, or Firm—Larson and Taylor

[57] ABSTRACT

An irrigation system is provided wherein a conventional central pivot spray-type system is converted into a ground release system through the use of a plurality of flexible hoses that release the water at ground level. A plurality of perforations at the distal end of the hose provide a spray effect without the water evaporation loss associated with conventional spray systems. Braces also prevent the hoses from swinging sideways and becoming entangled.

8 Claims, 7 Drawing Figures

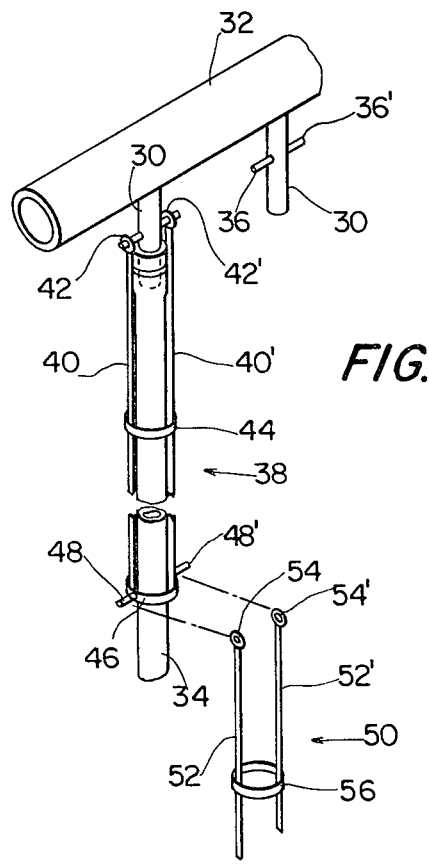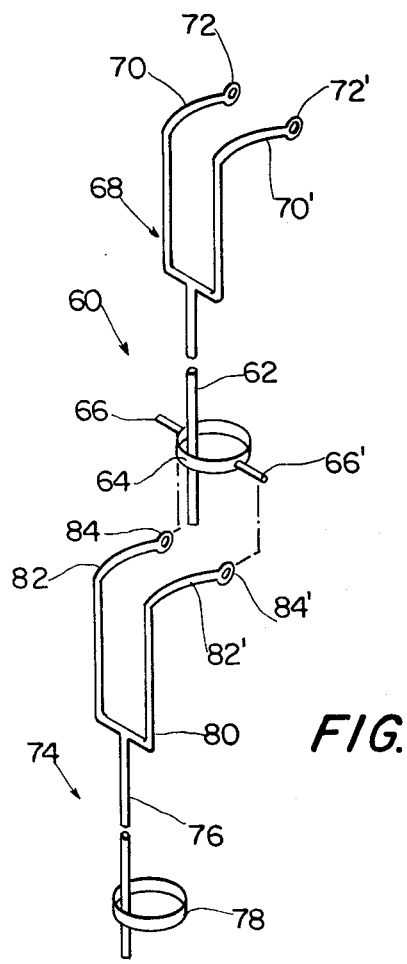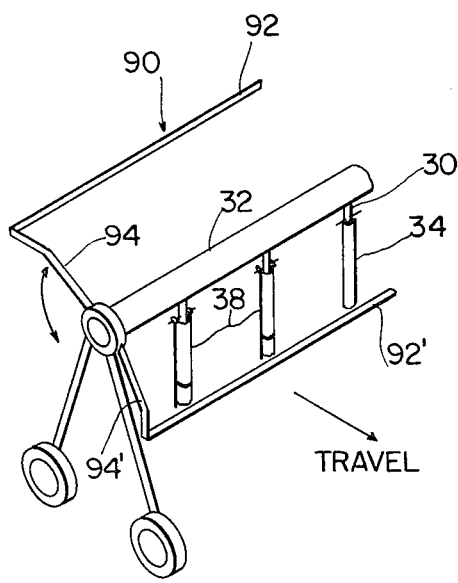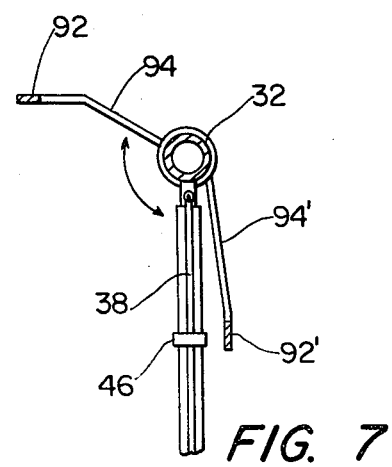

GROUND RELEASE IRRIGATION SYSTEM

CROSS REFERENCE TO A RELATED APPLICATION

This is a continuation-in-part of application Ser. No. 187,985, filed Sept. 17, 1980 now abandoned.

FIELD OF THE INVENTION

The present invention relates to irrigation systems and, more particularly, to so-called pivot-type irrigation systems wherein a water distribution pipe, mounted on a series of wheeled carriages, is rotated about a central pivot and water is supplied to the pipe for distribution by sprayer heads located along the length of the pipe.

BACKGROUND OF THE INVENTION

A popular form of conventional irrigation system is the so-called central pivot system which employs a main distribution pipe mounted on a series of wheeled carriages for rotation about a central pivot point. The main distribution pipe includes a series of sprinkler heads arranged along the length thereof which spray water onto the crops as the pipe is rotated and thus provide spray coverage over the entire area traversed by the pipe. A typical system of this type is described in more detail below.

One disadvantage of such a system is that the spray is projected into the atmosphere and hence loses significant effectiveness due to evaporation. It will be appreciated that this can be a substantial problem over an extended period of time particularly where operations take place in very hot weather.

As explained below, the present invention in part concerns the provision of elongate flexible hoses which extend downwardly from the main distribution pipe to the ground and which thus releases the water at ground level. Examples of broadly similar systems are disclosed in U.S. Pat. Nos. 2,249,130 (Gunther) and 3,643,442 (Houston). The Gunther patent discloses an irrigation machine wherein lengths of flexible hoses depend from a substantially horizontal delivery pipe down to the ground so as to drag in ditches between the row crops. The Houston patent discloses an irrigating machine wherein elongated, generally flexible conduits or hoses extend downwardly from auxiliary conduits so as to discharge water directly into slots in the soil provided for this purpose.

SUMMARY OF THE INVENTION

In accordance with the invention, an adaptor device is provided for converting a conventional central pivot system into a system wherein the water is released at ground level. The adaptor device includes a plurality of elongated, highly flexible hoses or lines along the length thereof which extend downwardly to the ground, and mounts on the water outlets of the main distribution pipe of the central pivot system so as to serve in distributing water from the water outlets to the hoses and thus in providing for release of the water at the ground level. An important feature of the invention concerns the provision of a plurality of holes or perforations in the distal ends of the hoses so that a limited spraying effect is afforded without the substantial water evaporation losses associated with conventional central pivot sytems. Moreover, the water hoses or lines are not confined to ditches or slots. In this regard, the water lines are, as stated, highly flexible, thereby allowing irrigation by "cross rowing" as well as "rowing". Further, as explained in more detail hereinbelow, the water lines can be integrated with sprinklers to increase the area of coverage.

In a preferred embodiment of the invention, braces are provided at the upper portion of each hose to prevent the hoses from swinging sideways and becoming entangled. The braces permit the hoses to move backwards, but prevent any substantial side to side motion.

Other features and advantages of the invention will be set forth in, or apparent from, the detailed description of the preferred embodiments which follows.

BRIEF DESCRIPTION OF THE DRAWINGS

FIG. 4 is a perspective view of a brace for the hoses in accordance with the present invention;

FIG. 5 is a perspective view of an alternative embodiment of a brace for the hoses;

FIG. 6 is a highly schematic, perspective view of a portion of the irrigation system including a device which prevent forward swinging of the flexible hoses; and FIG. 7 is a cross-sectional plan view of the system depicted in FIG. 6.

DESCRIPTION OF PREFERRED EMBODIMENTS

Figure 1:
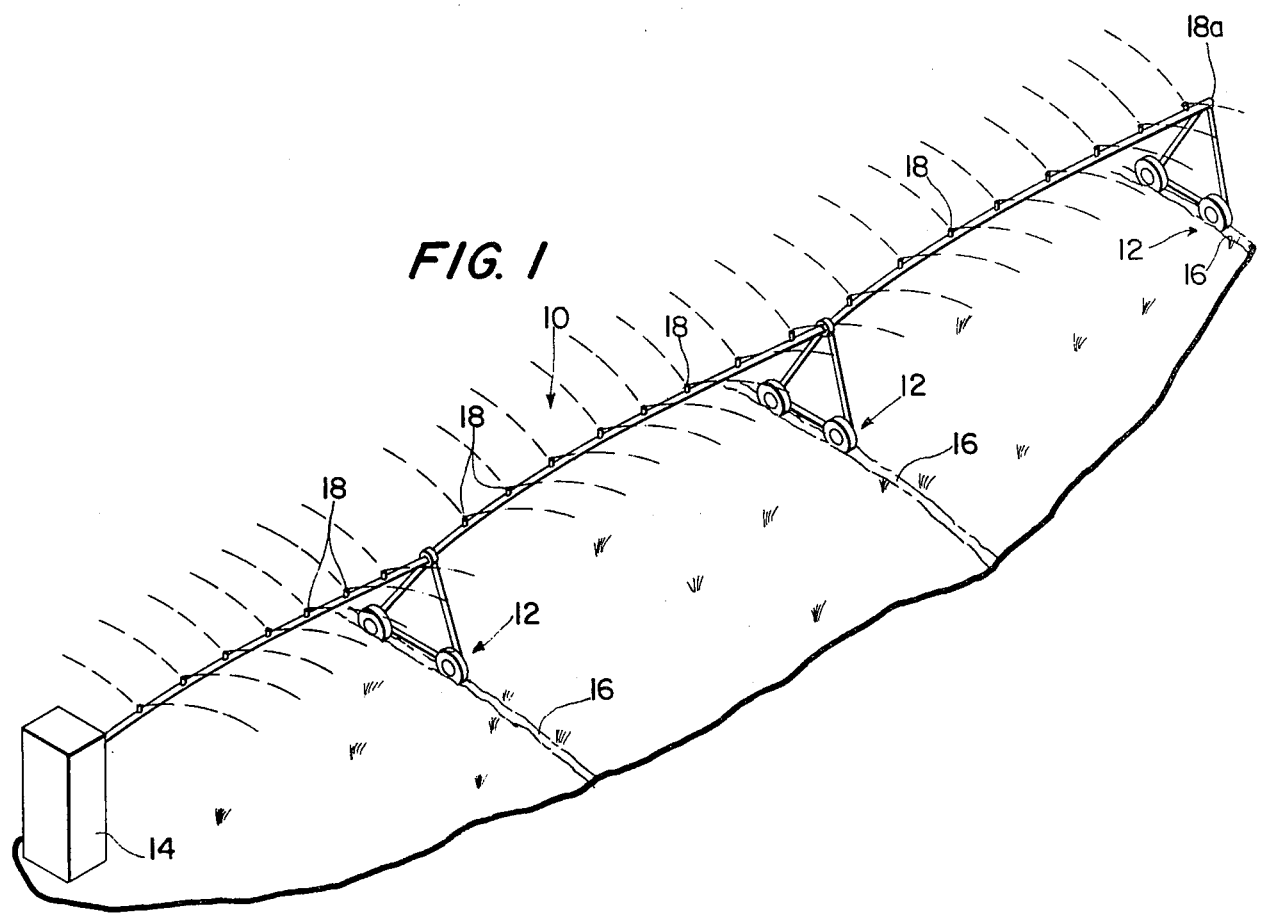
FIG. 1 is a highly schematic, perspective view of a central pivot irrigation system in which the present invention is adapted to be incorporated.

Referring to FIG. 1, a conventional "pivot"-type irrigation system is shown. These systems are well known and widely used and the details of such systems form no part of the invention. Reference is made, for example, to the brochure "Valley Corner System", dated 1977 and published by Valmont Industries, Inc. of Valley, Nebraska 68604, for a further description of one such system. As shown in FIG. 1, these systems characteristically comprise an elongated pipe (or sections of pipe), denoted 10, which is mounted on a series of radially spaced wheeled carriages 12. Pipe 10 and wheeled carriages 12 are caused to pivot or rotate about a central control station 14, so that the wheels of carriages 12 describe a series of concentric circles 16. A prescribed path of travel congruent with these circles 16 may be formed by clearing the crops to be irrigated along this path. As described in the brochure referred to above, a so-called "corner" spray unit can be provided at the outboard end of the pipe which is controlled by a guidance control system so as to describe a path dictated by a single buried wire, i.e., the corner spray unit traces out the pattern of the wire so as to cover the desired area.

Figure 2:
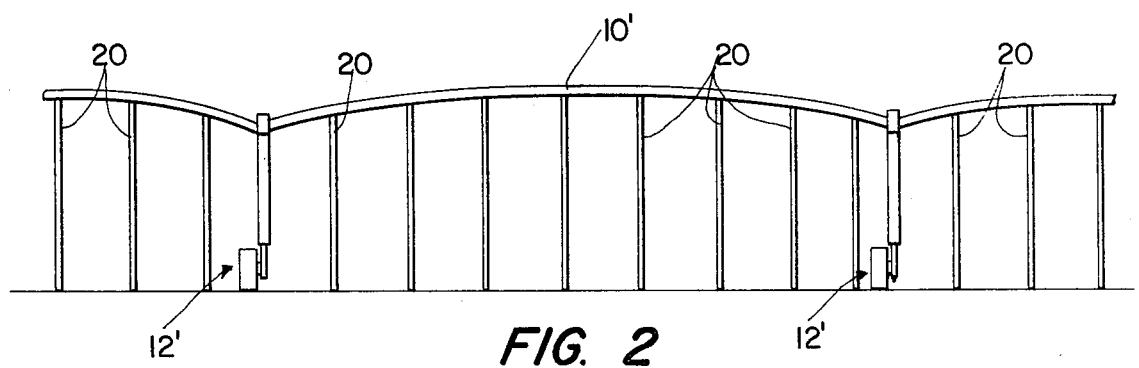
FIG. 2 is a schematic front elevational view of an irrigation system incorporating the invention.
Figure 3:
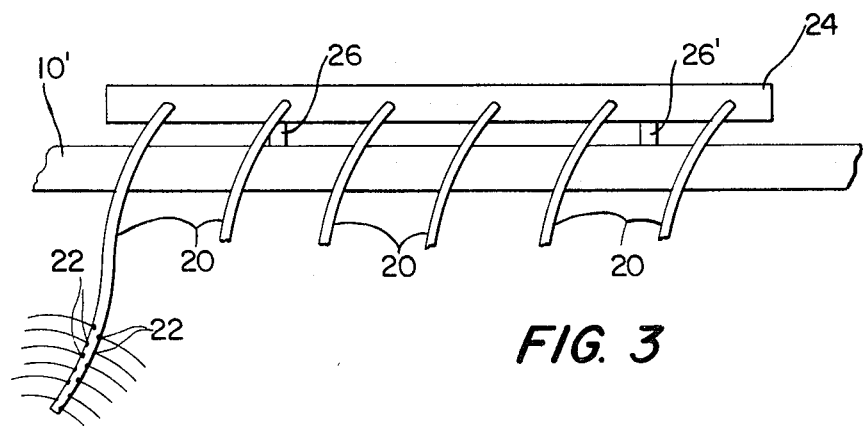
FIG. 3 is a perspective view of a portion of an adaptor device constructed in accordance with the invention for converting a conventional spray-type irrigation device into a ground release system.

Devices such as shown in FIG. 1 characteristically include a series of spray nozzles 18 along the length of the pipe 10, which nozzles may take a number of different forms. As discussed above, the use of such spray nozzles provides certain disadvantages particularly with respect to loss of effectiveness due to evaporation. The invention overcomes this problem in the manner illustrated in FIG. 2, wherein a series of highly resilient plastic hoses 20 are employed which extend from a main pipe 10' mounted on carriages 12' to the ground so that the water carried by the hoses is released at ground level. An important feature of the invention concerns the provision of a series of perforations at the ends of hoses 20 which provide a spraying effect at ground level so as to combine the coverage characteristics of a spray system with the advantages of ground level release of the water. This feature is illustrated in FIG. 3 wherein the perforations in one of the hoses 20 are indicated at 22. A further important feature of the invention is also illustrated in FIG. 3 and concerns the provision of an adaptor 24 which permits a conventional nozzle spray device to be converted into a ground release system. The adaptor 24 fits over the spray nozzle water outlets, indicated at 26, or over the spray nozzles themselves, depending on the actual nozzle design and its compatability with such an adaptor. Adaptor 24 includes a plurality of hoses 20 which extend downwardly therefrom in the same way as shown in FIG. 2 and a plurality of such adaptors may be positioned along the full length of the main pipe. It will be understood that adaptor 24 basically serves a distribution manifold for the water supplied through outlets 26, collecting the water from the outlets 26 and distributing this water through hoses 20 to the ground. Thus, adaptor 24 enables a conventional spray system to be readily converted to a ground release system.

The size and spacing of hoses 20 (and of perforations or holes 22) depend on a number of factors including the rotational speed of the pivot system, the water pressure to be used, the water coverage to be provided, etc., although it is contemplated that small plastic lines would be provided at intervals of two to three feet in a typical system. The lines should be very flexible so as to permit irrigation by "cross rowing" as well as by "rowing" as discussed above. The flexible water supply lines are adaptable to pivot systems of any height, thereby enabling use on any crop regardless of height. Further, the plastic lines or hoses can be used in place of a conventional sprinkler system or in combination therewith. For example, flexible lines could be used exclusively on the central pivot system and sprinklers employed at the end of the main distribution pipe (such as indicated at 18a in FIG. 1) in order to increase the radius of coverage.

Depicted in FIG. 4 is an alternative embodiment of the present invention in which hose fittings 30 are fluidly connected to outlets located in elongated pipe 32. Attached to each hose fitting 32 is a flexible hose 34 which is similar to hoses 20 described above. Each hose fitting 30 includes two axle projections 36 which are located on opposite sides of each fitting 30 and which extend parallel to pipe 32. A hose brace 38 is provided having two legs 40 and 40' and eyelets 42 and 42' at the proximal end of legs 40 and 40' respectively. A sleeve 44 and a sleeve 46 are attached to legs 40 and 40' approximately midway along the lengths thereof and at the distal ends thereof, respectively. Sleeve 46 also includes two axle projections 48 and 48' which are located on opposite sides of sleeve 46 and which extend parallel to pipe 32. As shown, flexible hose 34 extends through sleeves 44 and 46 as brace 38 is mounted by eyelets 42 and 42' on axle projections 36 and 36'. Thus, as pipe 32 is moved in either direction to provide irrigation, brace 38 allows hose 34 to swing forwards and backwards as brace 38 swings forwards and backwards about axle projections 36 and 36'. However, any substantial sideways movement of hose 34 is prevented by brace 38 which does not allow the upper portion of hose 34 located therein to move sideways. In this manner, hose 38 is free to swing over obstacles encountered, but hose 38 does not swing sideways to become entangled with other hoses.

Also shown in FIG. 4 is a brace extension 50. Brace extension 50 is provided with two legs 52 and 52' and eyelets 54 and 54' at the proximal ends of legs 52 and 52', respectively. A sleeve 56 is attached to legs 52 and 52' below the midpoints of legs 52 and 52'. Where it is desired to prevent more than the upper portion of hose 34 contained in brace 38 from moving sideways, brace extension 50 is attached by eyelets 54 and 54' to axle projections 48 and 48', respectively, with hose 34 extending through sleeve 56. In this manner, brace extension 50 is also free to swing forwards and backwards relative to pipe 32 but not to swing sideways. Thus, the portion of hose 34 located in brace 50 is likewise constrained and the sideways swinging of hoses resulting in tangling of adjacent hoses is further prevented.

FIG. 5 discloses an alternative embodiment of a brace 60 which is used where the irrigation system travels in one direction only. Brace 60 includes a leg 62 which extends through a sleeve 64 attached peripherally thereto. Sleeve 64 has two axle projections 66 and 66' which are located on opposite sides of sleeve 64 and which extend in opposite directions. Attached to the upper end of leg 62 is a U-member 68 having feet 70 and 70' extending perpendicualr thereto. The distal ends of feet 70 and 70' form eyelets 72 and 72'. Eyelets 72 and 72' are used to attach brace 60 to axle projections 36 and 36' of hose fitting 30 with hose 34 extending through sleeve 64 and U-member 68 located on the trailing side of hose 34. With this embodiment, brace 60 and hence the portion of hose 34 located therein are free to swing back as obstacles are encountered and sideways movement is similarly restrained as discussed above with regard to brace 38. However, forward movement of brace 60 and hose 34 is restrained as U-member 68 engages the lower end of hose fitting 30 (under hose 34). Allowing only rearward swinging of hose 34 further reduces the chances of entanglement of adjacent hoses. In addition, by preventing forward swinging of the hoses and hose ends, the turf ahead of the pipe 32 does not become muddy and hamper traction.

Also shown in FIG. 5 is a brace extension 74. Brace extension 50 is provided with a leg 76 which extends through a sleeve 78 attached peripherally thereto. Attached to the upper end of leg 76 is a U-member 80 having feet 82 and 82' extending perpendicular thereto. The distal ends of feet 82 and 82' form eyelets 84 and 84'. It should be noted that the height of U-member 80 is less than the distance which leg 62 extends below sleeve 64. Where it is desired to prevent additional portions of hose 34 contained in brace 60 from moving sideways and forwards, brace extension 74 is attached by eyelets 84 and 84' to axle projections 66 and 66', respectively, from the trailing side so that hose 34 is located in sleeve 78. In this manner, brace extension 74 is also free to swing backwards relative to pipe 32, but not to swing sideways or forwards. It should be noted that forward movement of brace extension 74 and the portion of hose 34 contained therein is restrained as U-member 80 engages the lower end of leg 62 of brace 60.

Depicted in FIGS. 6 and 7 is a swingable device 90 which is used in cooperation with brace 38 described above to prevent brace 38 from swinging forwards relative to pipe 32. Device 90 includes two crossbars 92 and 92' which are attached to pivot arms such as 94 and 94' at each end thereof. Pivot arms 94 and 94' are attached to a lockable collar (not shown) located about pipe 32. The collar is lockable in place so that, where pipe 32 is moving in the direction indicated, crossbar 92' is located slightly in front of sleeve 46 of brace 38 to prevent each of the braces 38 from swinging forwards while backward movement is unrestrained. Where the direction of movement of pipe 32 is reversed, the collar is rotated about pipe 32 and lockable in a new position so that crossbar 92 is rotated and lowered into place and now prevents forwards movement of braces 38 while crossbar 92' is raised out of the way to allow unrestrained backward movement. Preferably, the collar can be operatively connected to the wheels so as to assume the proper rotational position and to locate crossbars 92 and 92' depending on the direction of travel of pipe 32.

Although the invention has been described in relation to exemplary emobdiments thereof, it will be understood by those skilled in the art that variations and modifications can be effected in these exemplary embodiments without departing from the scope and spirit of the invention.

I claim:

1. For use in combination with a pivot-type irrigation system wherein a water distribution pipe supplied from a central source is rotated through a path of travel to provide irrigation of the area covered thereby, a plurality of downwardly depending hose fittings disposed along the length of the pipe, a plurality of flexible hoses attached to respective ones of said plurality of hose fittings, said hoses extending from the main pipe to the ground so as to release water therefrom at the distal end thereof at ground level, and hose movement restraining means for preventing lateral movement of said hoses relative to said path of travel, said hose restraining means including mounting means provided on opposite sides of each said hose fitting above the associated hose and a plurality of downwardly depending restraining braces, each supported by a said mounting means so as to be swingable in the direction of the path of travel of the distribution pipe, for restraining lateral movement of said hoses.

2. A system as claimed in claim 1 wherein said mounting means includes a pair of axle projections located on opposite sides of each side hose fitting above the associated hose.

3. A system as claimed in claim 1 further including a means for preventing substantial swinging of said braces forward of the water distribution pipe.

4. A system as claimed in claims 2 or 3 wherein each of said braces further include axle projections located at the distal end thereof, said restraining means further including an extension brace for each said brace supported from said axle projections on the associated said brace so as to be swingable on said brace in the path of travel, said extension brace restraining lateral movement of a further more distal portion of said hose.

5. A system as claimed in claim 3 wherein said means for preventing forward swinging of said brace comprises a portion of said brace disposed to abut said hose fitting as said brace swings forward so as to limit forward movement of said brace.

6. A system as claimed in claim 2 further comprising means for preventing forward swinging of said hose comprising a pair of bars pivotally mounted on the water distribution pipe and disposed in spaced parallel relationship to the water distribution pipe, and further including positioning means for locating one of said pair of bars adjacent the forward edge of said braces while the other bar is spaced away from said braces as the water distribution pipe moves in one direction and for locating the other bar adjacent the forward edge of said braces while the first bar is spaced away from said braces when the water distribution pipe moves in the opposite direction.

7. A system as claimed in claim 4 including means for preventing substantial swinging of said extension brace forward of the water distribution pipe.

8. A system as claimed in claim 7 wherein said means for preventing swinging of said extension brace comprises a portion of said extension brace which is disposed to abut said brace as said extension brace swings forward relative to said brace so as to limit forward movement of said extension brace.

* * * * *